UNITED STATES PATENT OFFICE.

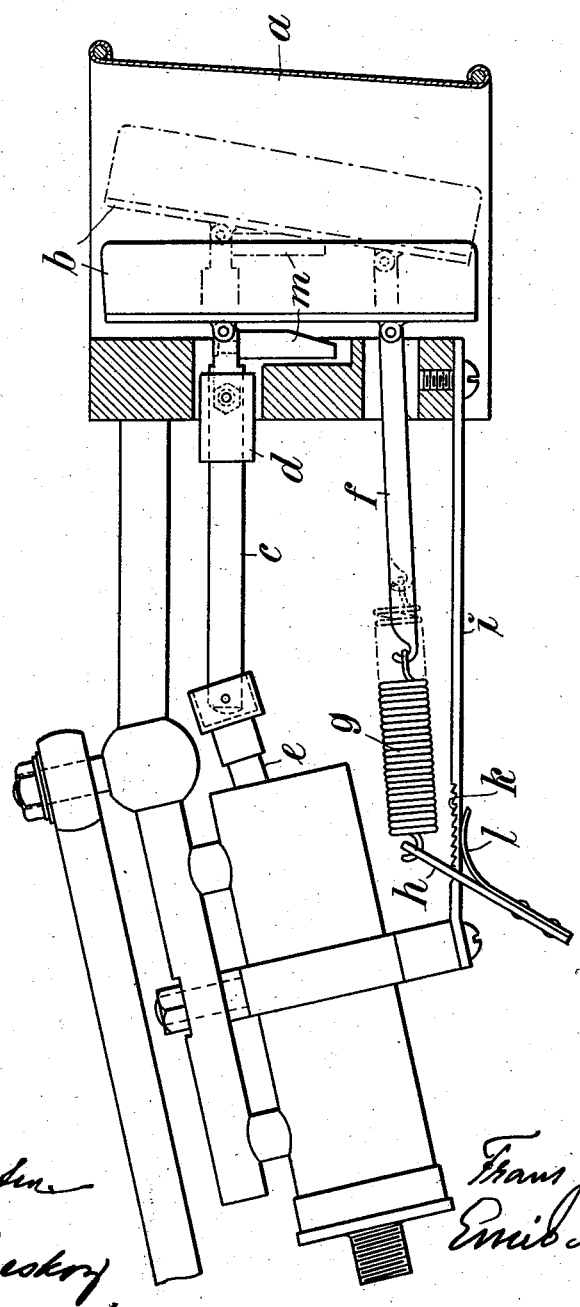

FRANS JOSEF JOHANSSON AND EMIL ALBERT OLSON GÖTHE, OF STOCKHOLM, SWEDEN.

MILKING-MACHINE.

1,010,148.   Specification of Letters Patent.   Patented Nov. 28, 1911.

Application filed January 3, 1911. Serial No. 600,413.

*To all whom it may concern:*

Be it known that we, FRANS JOSEF JOHANSSON and EMIL ALBERT OLSON GÖTHE, subjects of the King of Sweden, residing at Stockholm, in the Kingdom of Sweden, have invented new and useful Improvements in Milking-Machines, of which the following is a specification, reference being had to the drawing accompanying and forming a part hereof.

This invention relates to improvements in milking machines of the kind wherein the compressing member is under spring action in such a manner as to first compress the upper part of the teat, the spring action being thereupon counteracted so as to cause the compressing action to continually proceed downward. In milking machines of this kind the spring or springs were placed within the teat cup which is objectionable in several respects, since on account thereof the teat cups must be made comparatively large in size and the springs are not accessible for adjustment or repair.

The object of the invention is to remove the said drawbacks.

The invention consists, chiefly, in the spring or springs actuating the compressing member being placed outside the teat cup. Preferably, a coiled spring is used, said spring being placed between a point at or near the lower end of the compressing member and a fixed point outside the teat cup.

The invention further comprises the construction and combination of parts hereinafter set forth.

In the drawing, we have shown in side elevation and partial section a teat press and the operating means therefor.

Referring to the drawing, $a$ is the teat cup or sleeve which receives the teat. Movable within the said teat cup is the compressing member $b$. Pivotally connected to the upper part of the said compressing member is a rod $c$ movable in a sleeve $d$ pivotally attached to the wall of the teat cup. The rod $c$ is pivotally connected to a piston rod $e$ movable at an angle to the rod $c$, by which the compressing member $b$ is caused to swing when pressed against the teat.

Pivotally attached to the compressing member at or near the lower end thereof is a rod $f$ the outer end of which forms a hook serving as an attachment for one end of a coiled spring. The other end of said spring is attached to a part $h$ movable along a rod $i$. The rod is suitably provided with teeth $k$ adapted to engage the adjustable cross-piece $h$. When the latter is to be adjusted along the rod $i$, it is swung out of engagement with the teeth, the reëngagement of said part, when the same is released, being effected by a spring $l$ attached to the said part and bearing on the lower side of the rod $i$.

The device hereinbefore described works as follows. When the rod $c$ commences to move into the teat cup, the upper end of the compressing member is swung against the teat so as to compress the upper part thereof. Thereupon the compressing member $b$ under the continued movement of the rod $c$ commences to swing about its point of contact with the teat so as to gradually compress the teat from its root downward against the action of the spring $g$. When the upper end of the compressing member is retracted by the rod $c$ the spring $g$ retracts the lower end thereof so as to cause the compressing member to move back into the initial position shown by full lines.

In order to prevent the upper end of the compressing member $b$ from swinging too far downward, before it meets the teat, certain means may be provided, such as a cross-piece $m$ attached to the rod $c$. When the compressing member has swung a certain angle, it will bear on the cross-piece $m$, as shown by dotted lines, so that it cannot swing farther relatively to the rod $c$.

We claim:

1. In a milking machine, the combination of a teat cup adapted to inclose a teat, a compressing member movable in the said teat cup, means for driving the said compressing member, a spring placed outside the teat cup, and a connection between the said spring and the compressing member, passing through the wall of the teat cup, substantially as and for the purpose set forth.

2. In a milking machine, the combination of a teat cup adapted to inclose a teat, a compressing member movable in the said teat cup, means for driving the said compressing member, a link attached to the said compressing member and extending through the wall of the teat cup, and a coiled spring attached at one end to the said link and at its other end to a part outside the teat cup, substantially as and for the purpose set forth.

3. In a milking machine, the combination of a teat cup adapted to inclose a teat, a compressing member movable in the said teat cup, means for driving the said compressing member, a link attached to the said compressing member and extending through the wall of the teat cup, a spring attached at one end to the said link, and an adjustable anchor for the other end of the said spring, substantially as and for the purpose set forth.

4. In a milking machine, the combination of a teat cup adapted to inclose a teat, a compressing member movable in the said teat cup, means for driving the said compressing member, a spring placed outside the teat cup, a connection between the said spring and the compressing member, passing through the wall of the teat cup, and an abutment for limiting the swinging movement of the compressing member caused by the said spring, substantially as and for the purpose set forth.

5. In a milking machine, the combination of a teat cup, a compressing member movable in the said teat cup, means for driving the said compressing member, a connection between the said driving means and the compressing member allowing the latter to swing freely within the teat cup, an abutment placed on the said connection for limiting the swinging movement of the compressing member, a spring placed outside the teat cup, and a connection between the said spring and the compressing member, substantially as and for the purpose set forth.

6. In a milking machine, the combination of a teat cup, a compressing member movable in the said teat cup, means for driving the said compressing member, a connection between the said driving means and the compressing member allowing the latter to swing freely within the teat cup, an abutment placed on the said connection for limiting the swinging movement of the compressing member, a link attached to the said compressing member, and a coiled spring attached at one end to the said link and at its other end to a part outside the teat cup, substantially as and for the purpose set forth.

7. In a milking machine, the combination of a teat cup, a compressing member movable in the said teat cup, means for driving the said compressing member, a connection between the said driving means and the compressing member allowing the latter to swing freely within the teat cup, an abutment placed on the said connection for limiting the swinging movement of the compressing member, a toothed rod placed outside the teat cup, a part adjustable along the said rod, a spring acting on the said part so as to keep the same in adjusted position into engagement with the toothed part of the rod, a link attached to the said compressing member and extending through the wall of the teat cup, and a spring attached at one end to the said link and at its other end to the said adjustable part, substantially as and for the purpose set forth.

FRANS JOSEF JOHANSSON.
EMIL ALBERT OLSON GÖTHE.

Witnesses:
 AUG. SÖRENSEN,
 KARL RUNCSKOG.

---

Copies of this patent may be obtained for five cents each, by addressing the "Commissioner of Patents, Washington, D. C."